No. 695,174. Patented Mar. 11, 1902.
F. W. ROLLER.
PACKING OR GASKET.
(Application filed Sept. 19, 1900.)

(No Model.)

Witnesses:
Jas. E. Hutchinson.
Henry C. Hazard.

Inventor.
Frank W. Roller, by
Prindle and Russell, his Attys.

UNITED STATES PATENT OFFICE.

FRANK W. ROLLER, OF NEW YORK, N. Y.

PACKING OR GASKET.

SPECIFICATION forming part of Letters Patent No. 695,174, dated March 11, 1902.

Application filed September 19, 1900. Serial No. 30,486. (No model.)

*To all whom it may concern:*

Be it known that I, FRANK W. ROLLER, of the borough of Manhattan, city of New York, in the county of New York, and in the State of New York, have invented certain new and useful Improvements in Packings or Gaskets; and I do hereby declare that the following is a full, clear, and exact description thereof, reference being had to the accompanying drawings, in which—

Figure 1:
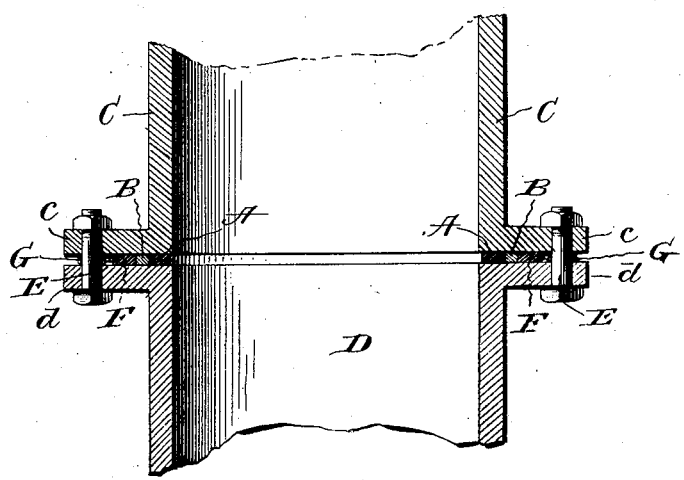
Figure 2:
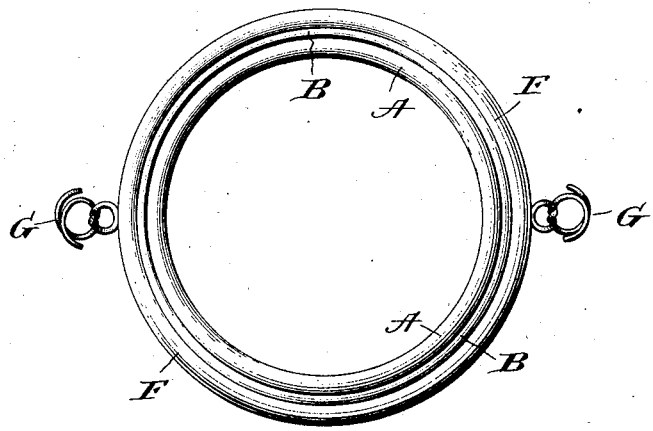
Figure 3:
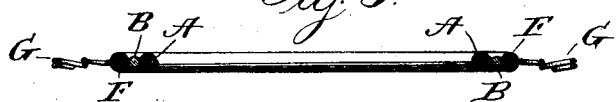

Figure 1 is a sectional view of a flanged pipe-joint having applied thereto a gasket embodying my invention, and Fig. 2 is a plan view of the gasket which is the subject of illustration in Fig. 1, and Fig. 3 is a sectional view of the same.

Letters of like name and kind refer to like parts in each of the figures.

The object of my invention is to prevent the deterioration of packings or gaskets for the joints of pipe or other apparatus by electrolytic action; and to such end my invention consists in the packing or gasket hereinafter specified.

In many uses of packings or gaskets the inner or outer or both surfaces thereof are exposed to the action of an electrolyte, and the portion of the gasket or packing thus exposed forms, with the adjacent portion of the pipe or other apparatus, a short-circuited galvanic couple which results in electrochemical action being set up, which dissolves or corrodes away the gasket material or that of which the surface which it packs is formed, according to the relative positions of these materials in the electrochemical series, finally causing a leak or a break. The usual conditions under which the action may take place are those wherein the packed joint is submerged or otherwise brought into contact with salt water, bilge water, &c. Such condition, for instance, exists in a condenser on shipboard, where one side of the packing or gasket is exposed to the action of salt water. If one of the flanges of the joint be formed of iron and the exposed surface of the gasket be of copper, as is frequently the case, electrochemical action will be set up, the salt water serving as the electrolyte, and the copper will be eaten away. Such action if continued long enough will destroy the usefulness of the gasket.

While my invention is not restricted to any particular form of gasket, I have chosen the gasket illustrated in the patent to Chas. H. Merwarth, granted June 21, 1898, No. 605,891, as one to which its application is well adapted. Said gasket consists of an inner packing-ring A, of soft or plastic material, such as lead, around and supporting which is a ring B, of harder metal, as copper. The gasket is shown as packing a joint between pipes C and D, such pipes having iron flanges $c$ and $d$, respectively, which flanges are drawn together by bolts E and E, and between which is clamped the gasket. The soft or plastic ring conforms to the irregularities of the surfaces of the flanges $c$ and $d$ and causes a perfect sealing of the joint. Said ring, however, in order to permit such action must be so soft that it will not have proper strength to withstand the pressure of the steam or other fluid to be confined, and to give the soft ring A the needed strength and to prevent its being crushed by the pressure of the pipe-flanges the harder copper ring B is placed around such soft ring. The copper ring can be of comparatively small cross-section and still have sufficient strength to sustain the lead ring, and it is preferably so made for reasons of economy; but in exposed situations the above-described action of salt water or other electrolyte soon weakens the copper ring and causes the joint to leak. In order to protect the copper from the action of the salt water, I provide outside of and preferably soldered or otherwise mechanically attached to the copper ring a wall or ring F, of lead or an inert substance or a substance which will not form with the material of the pipe-flange a galvanic couple. The ring F is preferably thicker than the copper ring, so that it will be compressed by the pipe-flanges and will form therewith a perfect seal. If desired, wires G and G can be soldered to the ring F to be bent around the bolts E and E for the purpose of centering the gasket. I prefer to use lead for the ring F with iron pipes, on account of its plasticity and cheapness and because I have found that the lead compound, probably an oxid, with which its surface becomes coated, almost entirely prevents electrolytic corrosion, either because of its high electrical resistance or its chemical inertness, or both. In practice I may either form the packing or gasket itself of a material which is close to the material of the pipe or other apparatus in the electrochemical series or I provide the gasket or packing with a protecting part or ring formed of such a substance or of an inert material, so that no galvanic couple of which the gasket is an element is presented to the action of the electrolyte. The metal for the protecting-ring which chemically best shields the gasket from electrochemical action is the metal of the flange, when possible to secure such metal in a sufficiently plastic state. For instance, a soft-iron protecting-ring can be used with an iron flange or a brass or copper protecting-ring can be used with a brass or copper flange, respectively. In case it is not convenient to use the same material for the protecting-ring as for the flanges I use a metal which is close to the latter material in the electrochemical series, thus securing immunity from electrochemical action, which immunity is made more complete by the contact resistance between the metals and in some cases by the formation on the surfaces thereof of chemical compounds of high electrical resistance or greater immunity from electrochemical attack.

I have shown and described my protecting-ring as applied to the outer side of the copper ring and the packing-ring as located on the inside of the copper ring. It will readily be understood, however, that in those cases where the pressure is toward the center of the gasket and the packing-ring is accordingly located outside of the copper ring the protecting-ring is placed inside of the copper ring.

While I have chosen the gasket in the above-mentioned patent as a specific gasket to which to apply my invention, it is to be understood that my invention is not confined to such specific instance, but is capable of application to any gasket which in the presence of an electrolyte will give rise to electrochemical action between it and the pipe or other apparatus.

My protecting-ring while serving to prevent electrochemical action between the gasket and the pipe or other apparatus will also in many cases serve to prevent direct chemical attack on the gasket.

Having thus described my invention, what I claim is—

1. Means for preventing electrochemical action between a metal pipe or other metal part to be packed, and a gasket therefor, such means consisting of the combination with the pipe, of a gasket having its exposed surface formed of a metal which is close to the material of said pipe in the electrochemical series, whereby electrochemical action between such exposed surface and said pipe is prevented, substantially as and for the purpose described.

2. Means for preventing electrochemical action between a metal pipe, or other metal part to be packed, and a gasket therefor, such means consisting of the combination with the pipe, of a gasket having its exposed surface formed of a metal which, under the action of the chemical substances to which the gasket is exposed, becomes coated with a compound which prevents electrochemical action between the gasket and said pipe, substantially as and for the purpose described.

3. Means for preventing electrochemical action between a metal pipe, or other metal part to be packed, and a gasket therefor having a part which is subject to attack, such means consisting of the combination with the pipe, of a gasket having a separate protecting-wall to cover the part of said gasket which is subject to attack, such protecting-wall being formed of a metal which is close to the material of said metal part in the electrochemical series, whereby electrochemical action between such part of the gasket which is subject to attack and said pipe is prevented, substantially as and for the purpose described.

4. Means for preventing electrochemical action between an iron pipe, or iron part to be packed, and a gasket having a copper part, such means consisting of the combination with the iron pipe, of a lead protecting-wall for such copper part, whereby the latter will be protected from electrochemical action, substantially as and for the purpose described.

In testimony that I claim the foregoing I have hereunto set my hand this 30th day of August, 1900.

FRANK W. ROLLER.

Witnesses:
G. E. SNIDER,
H. I. SHIRE.